US012730294B2

(12) United States Patent
Diez-Ochoa et al.

(10) Patent No.: US 12,730,294 B2
(45) Date of Patent: Sep. 8, 2026

(54) MICROSCOPE SYSTEM AND SYSTEM, METHOD, AND COMPUTER PROGRAM FOR A MICROSCOPE SYSTEM

(71) Applicant: Leica Instruments (Singapore) Pte. Ltd., Singapore (SG)

(72) Inventors: Miguel Diez-Ochoa, Singapore (SG); Robert Alexander Lockey, Singapore (SG)

(73) Assignee: Leica Instruments (Singapore) Pte Ltd., Singapore (SG)

( * ) Notice: Subject to any disclaimer, the term of this patent is extended or adjusted under 35 U.S.C. 154(b) by 270 days.

(21) Appl. No.: 18/180,168

(22) Filed: Mar. 8, 2023

(65) Prior Publication Data

US 2023/0288690 A1 Sep. 14, 2023

(30) Foreign Application Priority Data

Mar. 8, 2022 (EP) .................................... 22160913

(51) Int. Cl.
*G02B 21/22* (2006.01)
*G01N 21/64* (2006.01)
(Continued)

(52) U.S. Cl.
CPC ......... *G02B 21/22* (2013.01); *G01N 21/6458* (2013.01); *G02B 21/0012* (2013.01);
(Continued)

(58) Field of Classification Search
CPC .... G02B 21/22; G02B 21/0012; G02B 21/16; G02B 21/368; G02B 30/22;
(Continued)

(56) References Cited

U.S. PATENT DOCUMENTS 5,867,210 A 2/1999 Rod
6,525,878 B1 * 2/2003 Takahashi .............. G02B 30/34
359/380

(Continued)

FOREIGN PATENT DOCUMENTS

DE 102014016850 A1 5/2016
EP 1333306 A2 8/2003
(Continued)

OTHER PUBLICATIONS

Jongsub Moon et al: "A new technique for three-dimensional measurements of skin surface contours: evaluation of skin surface contours according to the ageing process using a stereo image optical topometer; Evalution of skin surface contours according to the ageing process", Physiological Measurement, Institute of Physics Publishing, Bristol, GB, vol. 23, No. 2, May 1, 2002 (May 1, 2002), pp. 247-259, XP020073601, ISSN: 0967-3334, DOI: 10.1088/0967-3334/23/2/301.

(Continued)

*Primary Examiner* — Said Broome
*Assistant Examiner* — Jordan Wan Yick
(74) *Attorney, Agent, or Firm* — 2SPL Patent Attorneys PartG mbB; Yong Beom Hwang

(57) ABSTRACT

Examples relate to a microscope system, such as surgical microscope system, and to a system, a method, and a computer program for a microscope system. The system is configured to obtain sensor data of at least one sensor of the microscope system, the sensor data representing a view of a sample being observed through a microscope of the microscope system. The system is configured to determine a three-dimensional representation of the sample based on the sensor data. The system is configured to determine information on a viewing angle of an observer. The system is configured to determine a computer-generated view of the
(Continued)

sample from the viewing angle of the observer based on the three-dimensional representation of the sample. The system is configured to generate a display signal for a display device, the display signal comprising the computer-generated view of the sample.

13 Claims, 6 Drawing Sheets

(51) Int. Cl.

| | |
|---|---|
| ***G02B 21/00*** | (2006.01) |
| ***G02B 21/16*** | (2006.01) |
| ***G02B 21/36*** | (2006.01) |
| ***G02B 30/22*** | (2020.01) |
| ***G06F 3/01*** | (2006.01) |
| ***G06T 7/593*** | (2017.01) |
| ***G06T 7/90*** | (2017.01) |
| ***G06T 15/20*** | (2011.01) |
| ***H04N 13/00*** | (2018.01) |
| ***H04N 13/239*** | (2018.01) |

(52) U.S. Cl.
CPC ........... *G02B 21/16* (2013.01); *G02B 21/368* (2013.01); *G02B 30/22* (2020.01); *G06F 3/012* (2013.01); *G06T 7/593* (2017.01); *G06T 7/90* (2017.01); *G06T 15/205* (2013.01); *H04N 13/239* (2018.05); *G06T 2207/10012* (2013.01); *G06T 2207/10056* (2013.01); *G06T 2207/10064* (2013.01); *G06T 2207/20212* (2013.01); *G06T 2207/30004* (2013.01); *G06T 2210/41* (2013.01); *H04N 2013/0081* (2013.01)

(58) Field of Classification Search
CPC ..... G01N 21/6458; G06F 3/012; G06T 7/593; G06T 7/90; G06T 15/205; H04N 13/239
See application file for complete search history.

(56) References Cited

U.S. PATENT DOCUMENTS

| | | | | |
|---|---|---|---|---|
| 11,786,206 B2 * | 10/2023 | Steines | A61B 6/462 | 378/91 |
| 2007/0016025 A1 * | 1/2007 | Arenson | A61B 8/467 | 600/437 |
| 2015/0346472 A1 * | 12/2015 | Saur | G02B 21/367 | 359/369 |
| 2016/0313548 A1 * | 10/2016 | Fujii | H04N 13/211 | |
| 2017/0085855 A1 * | 3/2017 | Roberts | A61B 5/0042 | |
| 2022/0007991 A1 * | 1/2022 | Roberts | G06T 7/33 | |

FOREIGN PATENT DOCUMENTS

| | | | | |
|---|---|---|---|---|
| EP | 3859423 A1 * | 8/2021 | G02B 21/362 |
| EP | 4006615 A1 | 6/2022 | |

OTHER PUBLICATIONS

Yan Hu et al: “Dynamic 3D measurement of thermal deformation based on geometric-constrained stereo-matching with a stereo microscopic system”, Measurement Science and Technology, IOP, Bristol, GB, vol. 30, No. 12, Sep. 17, 2019 (Sep. 17, 2019), p. 125007, XP020344398, ISSN: 0957-0233, DOI: 10.1088/1361-01/AB35A1 [retrieved on Sep. 17, 2019].
Hu Yan et al: “Microscopic fringe projection profilometry comparison based on stereoscopic microscope and telecentric lenses”, SPIE Proceedings; [Proceedings of SPIE ISSN 0277-786X], SPIE, US, vol. 11189, Nov. 18, 2019 (Nov. 18, 2019), pp. 1118909-1118909, XP060126455, DOI: 10.1117/122537483 ISBN: 978-1-5106-3673-6.

* cited by examiner

MICROSCOPE SYSTEM AND SYSTEM, METHOD, AND COMPUTER PROGRAM FOR A MICROSCOPE SYSTEM

CROSS-REFERENCE TO RELATED APPLICATION

This application claims priority to European Application 22160913.4, which was filed on Mar. 8, 2022. The content of this earlier filed application is incorporated by reference herein in its entirety.

TECHNICAL FIELD

Examples relate to a microscope system, such as surgical microscope system, and to a system, a method, and a computer program for a microscope system.

BACKGROUND

In surgical microscope system, a surgeon often uses a main pair of oculars or ocular displays to perform the surgical procedure. In many cases, the surgeon does not perform the surgical procedure alone, but with the help of an assistant. For this purpose, some surgical microscopes feature a second pair of oculars or ocular displays (called "side-assistant viewer"), which can be used by the assistant. In general, the view through the side-assistant viewer is limited by the optical channels being used for the main pair of oculars, such that the side-assistant viewer either has the same view as the main pair of oculars, which may be unintuitive, or such that the side-assistant viewer receives an image that is based on one of the stereo channels of the main surgeon, and thus lacks three-dimensional information. For example, in surgical microscopes that provide a directional view of the operation site to the assistant ocular, usually a view from only one beam path is transmitted to the ocular and is optically rotated. By doing so, the view of the operation site is correctly oriented but is only in 2D.

There may be a desire for an improved concept for a side-assistant viewer.

SUMMARY

This desire is addressed by the subject-matter of the independent claims.

The concept proposed in the present disclosure is based on the insight, that the stereo information being available in stereoscopic (surgical) microscopy comprises sufficient information to reconstruct a three-dimensional view of a sample being imaged, such as a surgical site. Image processing techniques, such as the determination of a disparity map, can be applied on the digital stereoscopic images to determine a three-dimensional representation, e.g., a three-dimensional surface model, of the sample being imaged. Alternatively, or additionally, a depth sensor can be used to determine the three-dimensional representation. This three-dimensional representation can now be used to generate the view for the side-assistant viewer, e.g., by generating stereoscopic images from the viewing angle of the side-assistant viewer. The same approach can be taken to generate (stereoscopic) images for a head-mounted display that can be used as side-assistant viewer (or as main viewer). Thus, a side assistant viewer or a head-mounted display can be supplied with a view of the sample being viewed, without losing the three-dimensional impression of the object and without loss of intuition due to the object being viewed from the "wrong" angle.

Various examples of the present disclosure relate to a system for a microscope system. The system comprises one or more processors and one or more storage devices. The system is configured to obtain sensor data of at least one sensor of the microscope system. The sensor data represents a view of a sample being observed through a microscope of the microscope system. The system is configured to determine a three-dimensional representation of the sample based on the sensor data. The system is configured to determine information on a viewing angle of an observer. The system is configured to determine a computer-generated view of the sample from the viewing angle of the observer based on the three-dimensional representation of the sample. The system is configured to generate a display signal for a display device. The display signal comprises the computer-generated view of the sample. Thus, the display device is provided with a suitable view of the sample, which mimics the viewing angle of the display device relative to the microscope or sample.

As outlined above, one approach for generating the three-dimensional representation uses the three-dimensional information that is inherent to the stereoscopic view of the sample being used for a main pair of oculars. The system may be configured to obtain stereoscopic imaging sensor data from at least a first and a second optical imaging sensor of the microscope. The system may be configured to determine the three-dimensional representation of the sample based on the stereoscopic imaging sensor data. Thus, the three-dimensional representation may be generated without requiring an additional (depth) sensor.

In particular, the stereoscopic imaging sensor data may be used to generate a disparity map, which represents the differences between the two channels of the stereoscopic imaging sensor data. Accordingly, the system may be configured to determine a disparity map based on the stereoscopic imaging sensor data, and to determine the three-dimensional representation of the sample based on the disparity map. Disparity maps are a suitable technique for determining a three-dimensional surface model of the sample.

The disparity map can then be "colored" using the color information that is also contained in the stereoscopic imaging sensor data. For example, the system may be configured to determine a three-dimensional structure of the three-dimensional representation based on the disparity map. The system may be configured to determine color information of the three-dimensional representation based on color information included in the stereoscopic imaging sensor data. For example, the color information may be extracted based on a correspondence between the pixels of the disparity map and the color pixels of the stereoscopic imaging sensor data.

Some types of microscope systems, such as stereoscopic microscope systems, feature different types of imaging techniques. In addition to visible light (i.e., reflectance) imaging, fluorescence imaging may be used to detect the fluorescence emissions of fluorophores being injected in blood vessels of a patient. For example, the stereoscopic imaging sensor data may comprise separate reflectance imaging sensor data and fluorescence imaging sensor data. These fluorescence emissions may be shown as a pseudocolor component that is integrated in a composite view, together with the visible light image. In the proposed concept, the fluorescence emissions may also be included in the three-dimensional representation, so they can also be perceived through the side-assistant viewer or head-mounted display. Accordingly, the system may be configured to include a representation of the fluorescence imaging sensor data in the three-dimensional representation of the sample. For example, the system may be configured to generate composite stereoscopic images from the reflectance imaging sensor data and the fluorescence imaging sensor data. The system may be configured to generate a disparity map based on the composite stereoscopic images. The system may be configured to determine the three-dimensional representation of the sample based on the disparity map.

As outlined above, in addition to stereoscopic imaging sensor data, or as an alternative, depth sensor data of a depth sensor can be used to determine three-dimensional representation of the sample. For example, the system may be configured to obtain depth sensor data from a depth sensor of the microscope system. The system may be configured to determine the three-dimensional representation of the sample based on the depth sensor data. This may improve the accuracy of the three-dimensional representation and/or provide an approach that is suitable for non-stereoscopic microscopes.

Some depth sensors provide depth information and color information, e.g., as so-called RGB-D (Red-Green-Blue-Depth) data. For example, the depth sensor data may comprise depth information and color information. The system may be configured to determine a three-dimensional structure of the three-dimensional representation based on the depth information included in the depth sensor data and to determine color information of the three-dimensional representation based on the color information included in the depth sensor data. In this case, the depth sensor data may suffice to provide the three-dimensional representation with color information.

Alternatively (or additionally), the color information may be taken from imaging sensor data of an optical imaging sensor of the microscope. For example, the depth sensor data may comprise depth information. The system may be configured to obtain imaging sensor data from an optical imaging sensor of the microscope. The system may be configured to determine a three-dimensional structure of the three-dimensional representation based on the depth information included in the depth sensor data and to determine color information of the three-dimensional representation based on color information included in the imaging sensor data. For example, the color information included in the imaging sensor data may have higher fidelity than the color information of the depth sensor data and may include both reflectance imaging sensor data and fluorescence imaging sensor data.

In some examples, the three-dimensional representation may be re-created from scratch for every sample of sensor data of the optical imaging sensor or depth sensor. For example, the sensor data may comprise a plurality of temporally successive samples of sensor data. The system may be configured to recreate the three-dimensional representation of the sample for each sample of the plurality of temporally successive samples of sensor data. This may decrease the computational complexity of the determination of the three-dimensional representation of the sample.

Alternatively, the three-dimensional representation may be iteratively refined over the samples of the sensor data. Again, the sensor data comprises a plurality of temporally successive samples of sensor data. The system may be configured to iteratively update the three-dimensional representation of the sample based on the plurality of temporally successive samples of sensor data. This may avoid artefacts that arise due to limitations inherent to the determination of the three-dimensional sensor data, at the expense of computational complexity.

Various means may be used to determine the viewing angle of the observer. For example, the system may be configured to determine the information on the viewing angle of the observer from one of a user input obtained via an input device, sensor data of a position sensor or acceleration sensor of a head-mounted display, positioning information of camera-based positioning system, and information on a position of a secondary pair of oculars of the microscope system. For example, the user input and the information on a position of a secondary pair of oculars of the microscope system may be particularly suitable for use with side-assistant viewers that are mounted permanently or semi-permanently at the microscope, while the position sensor, acceleration sensor or camera-based positioning system may be particularly suitable for use with a head-mounted display.

For example, as outlined above, the proposed concept may be used for a side-assistant viewer, i.e., a secondary pair of oculars. Accordingly, the system may be configured to provide the display signal to a secondary pair of oculars of the microscope system. The system may be configured to determine the information on the viewing angle of the observer based on an orientation of the secondary pair of oculars relative to the microscope. For example, the user input and the information on a position of a secondary pair of oculars of the microscope system may be used to determine the orientation of the secondary pair of oculars relative to the microscope.

Alternatively (or additionally), the system may be configured to provide the display signal to a head-mounted display. For example, the system may be configured to determine the information on the viewing angle of the observer based on an orientation of the head-mounted display relative to the sample. For example, the position sensor, acceleration sensor or camera-based positioning system may be used to determine the orientation of the head-mounted display relative to the sample.

The proposed concept is particularly suitable for applications in surgical microscopy, where a main surgeon uses a main pair of oculars to view the sample, and where the proposed concept is used to provide the display signal for a secondary display device, such as a side-assistant viewer or head-mounted display. For example, the system may be configured to obtain stereoscopic imaging sensor data from at least a first and a second optical imaging sensor of the microscope. The system may be configured to generate a primary display signal based on the stereoscopic imaging sensor data. The system may be configured to provide the primary display signal to a primary pair of oculars of the microscope system. The system may be configured to generate the display signal as secondary display signal based on the three-dimensional representation of the sample. The system may be configured to provide the secondary display signal to a secondary display device of the microscope system.

Various examples of the present disclosure relate to a corresponding method for a microscope system. The method comprises obtaining sensor data of at least one sensor of the microscope system, the sensor data representing a view of a sample being observed through a microscope of the microscope system. The method comprises determining a three-dimensional representation of the sample based on the sensor data. The method comprises determining information on a viewing angle of an observer. The method comprises determining a view of the sample from the viewing angle of the observer based on the three-dimensional representation of the sample. The method comprises generating a display signal for a display device, the display signal comprising the view of the sample.

Various examples of the present disclosure relate to a corresponding computer program with a program code for performing the above method when the computer program is executed on a processor.

SHORT DESCRIPTION OF THE FIGURES

Some examples of apparatuses and/or methods will be described in the following by way of example only, and with reference to the accompanying figures, in which FIGS. 1*a* and 1*b* show schematic diagrams of examples of a system for a microscope system and of a corresponding microscope system;

FIG. 1*c* shows a schematic diagram of a surgical microscope system;

DETAILED DESCRIPTION

Various examples will now be described more fully with reference to the accompanying drawings in which some examples are illustrated. In the figures, the thicknesses of lines, layers and/or regions may be exaggerated for clarity.

Figure 1A:
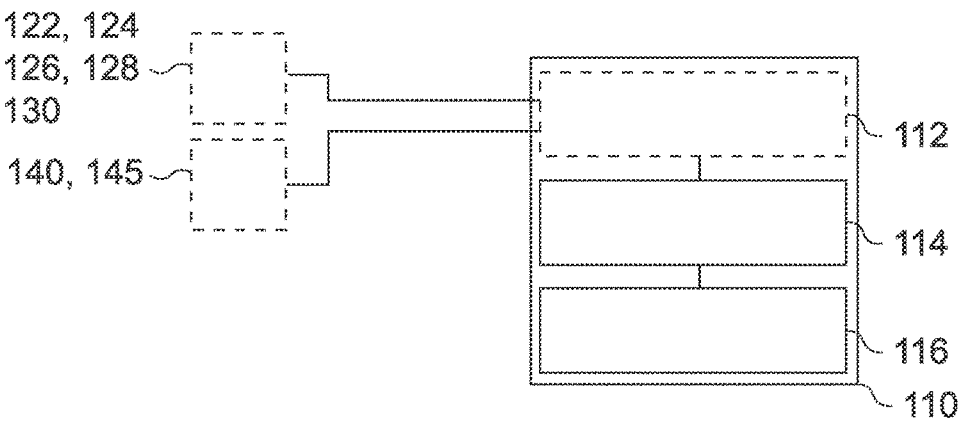
Figure 1B:
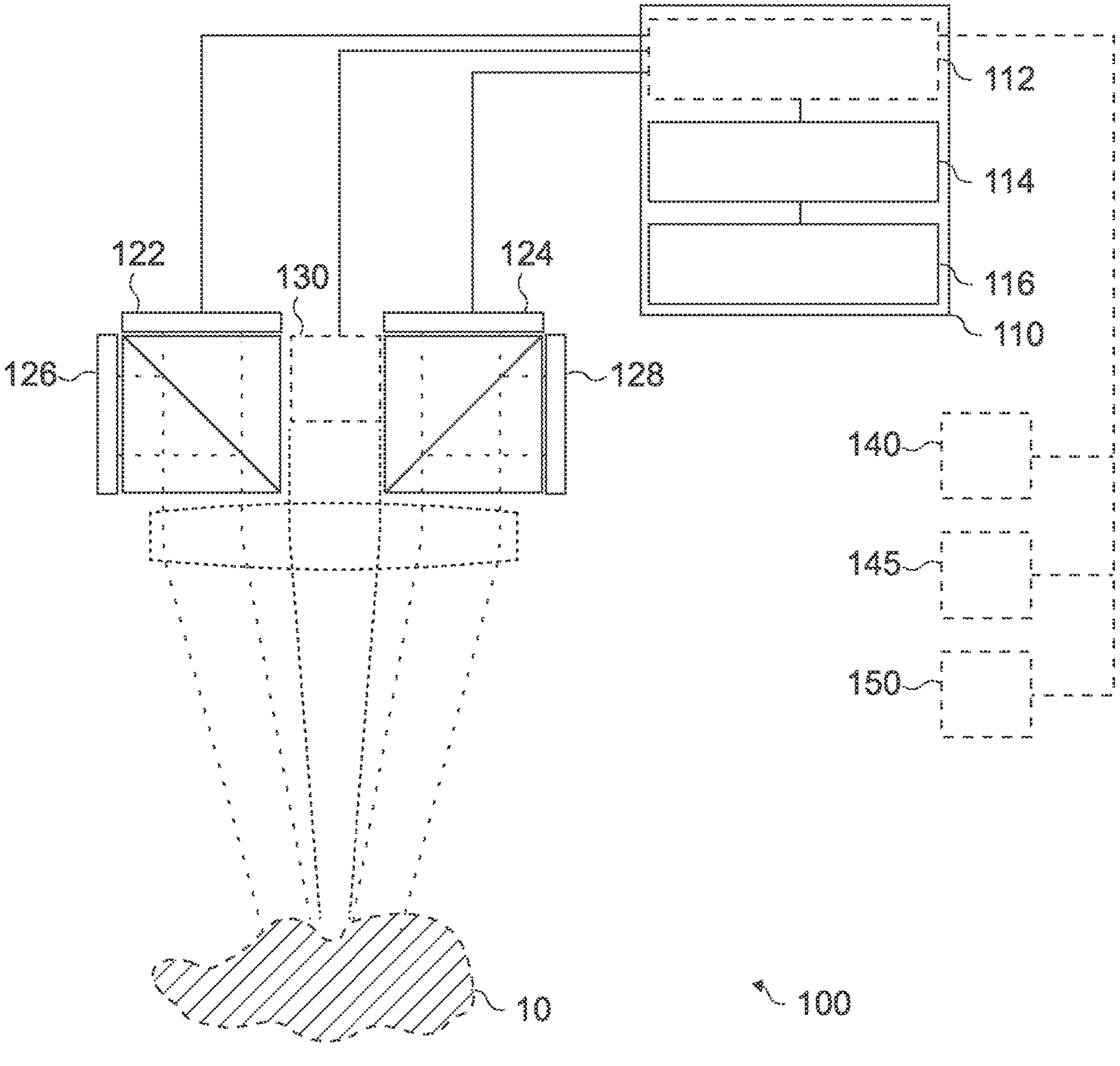

FIGS. 1*a* and 1*b* show schematic diagrams of examples of a system 110 for a microscope system 100 and of a corresponding microscope system 100 comprising the system 110. The system 110 is tasked with controlling various aspects of a microscope 120 of the microscope system 100, which may be a surgical microscope system, and of the entire microscope system and/or with processing various types of sensor data of the microscope system. Consequently, the system 110 may be implemented as a computer system, which interfaces with the various components of the microscope system.

The system 110 comprises, as shown in FIG. 1*a*, one or more processors 114 and one or more storage devices 116. Optionally, the system further comprises one or more interfaces 112 and/or one or more graphics processing units 118 (shown in FIG. 3). The one or more processors 114 are coupled to the one or more storage devices 116, to the optional one or more interfaces 112 and to the optional one or more graphics processing units. In general, the functionality of the system is provided by the one or more processors 114, in conjunction with the one or more interfaces 112 (for exchanging information, e.g., with at least one optical imaging sensor 122; 124; 126; 128 of the microscope 120, with an optional depth sensor 130 of the microscope system, and/or with a display device 140; 145; 150 of the surgical microscope system), with the one or more storage devices 116 (for storing and/or retrieving information), and/or with the one or more graphics processing units (for performing graphical calculations, such as the determination of a computer-generated view, and/or generating a display signal).

The system 110 is configured to obtain sensor data of at least one sensor 122; 124; 126; 128; 130 of the microscope system, e.g., via the at least one interface 12. The sensor data represents a view of a sample 10 being observed through the microscope 120 of the microscope system. The system 110 is configured to determine a three-dimensional representation of the sample based on the sensor data. The system 110 is configured to determine information on a viewing angle of an observer. The system 110 is configured, e.g., using the one or more graphics processing units, to determine a computer-generated view of the sample from the viewing angle of the observer based on the three-dimensional representation of the sample. The system 110 is configured, e.g., using the one or more graphics processing units, to generate a display signal for a display device 145; 150, the display signal comprising the computer-generated view of the sample.

The proposed concept is built around two main components—the microscope 120, which comprises the optical components, and which may house display devices being used to view the sample, and the system 110, which is used to control the microscope system 100, process sensor data of the microscope 120, and to generate a display signal for the display device or devices of the microscope system.

In general, a microscope, such as the microscope 120, is an optical instrument that is suitable for examining objects that are too small to be examined by the human eye (alone). For example, a microscope may provide an optical magnification of a sample, such as a sample 10 shown in FIG. 1*b*. In modern microscopes, the optical magnification is often provided for a camera or an imaging sensor, such as the optical imaging sensors 122; 124; 126; 128 of the microscope 120. The microscope 120 may further comprise one or more optical magnification components that are used to magnify a view of the sample, such as an objective (i.e., lens).

Figure 1C:
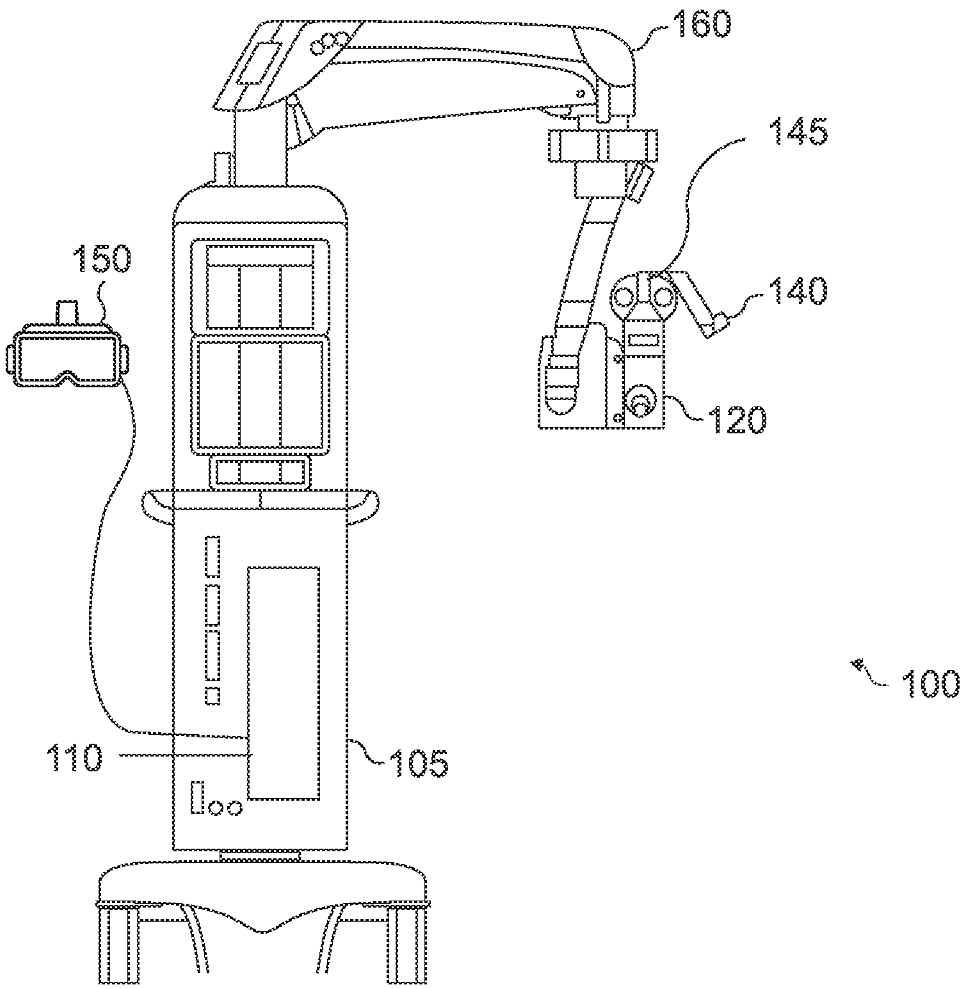

There are a variety of different types of microscopes. If the microscope is used in the medical or biological fields, the object 10 being viewed through the microscope may be a sample of organic tissue, e.g., arranged within a petri dish or present in a part of a body of a patient. In some examples of the present disclosure, e.g., as shown in FIG. 1*c*, the microscope 120 is a microscope of a surgical microscope system, i.e., a microscope that is to be used during a surgical procedure, such as an oncological surgical procedure or during tumor surgery. Accordingly, the object being viewed through the microscope, and shown in the image data, may be a sample of organic tissue of a patient, and may be in particular be the surgical site that the surgeon operates on during the surgical procedure. However, the proposed concept may also be applied to other types of microscopy, e.g., microscopy in a laboratory or microscopy for the purpose of material inspection.

As is evident, the microscope system 100 comprises a number of components, such as the system 110, the microscope 120 with the at least one optical imaging sensors 122; 124; 126; 128, an optional depth sensor 130, an optional main pair of ocular displays 140, an optional secondary pair of ocular displays 145 (as side-assistant viewer), and an optional head-mounted display 150. In the configuration shown in FIG. 1*b* (and in FIG. 3), the microscope 120 is a stereoscopic microscope that supports both visible light (reflectance) imaging and fluorescence imaging, and thus employs four optical imaging sensors, two optical imaging sensors 122; 124 for providing the two stereo channels for visible light imaging and two optical imaging sensors 126; 128 for providing the two stereo channels for fluorescence imaging. However, other implementations are possible, such as an implementation with a single optical imaging sensor (for non-stereoscopic microscopes), a single pair of optical imaging sensors for visible light imaging, or a pair of optical imaging sensors for visible light and fluorescence imaging. The system 110, the microscope 120, and the other components described afore are part of the microscope system, which is shown in FIGS. 1*b* and 1*c*.

FIG. 1*c* shows a schematic diagram of an example of a surgical microscope system 100 comprising the microscope 120 and the system 110. In general, a (surgical) microscope system is a system that comprises a microscope 120 and additional components, which are operated together with the microscope. In other words, a microscope system is a system that comprises the microscope and one or more additional components, such as the system 110 (which is a computer system being adapted to control and, for example, process imaging sensor data of the microscope), an illumination system (which is used to illuminate an object being imaged by the microscope), additional sensors, displays etc.

The surgical microscope system 100 shown in FIG. 1*b* comprises a number of optional components, such as a base unit 105 (comprising the system 110) with a stand, ocular displays 140; 145 that are arranged at the microscope 120, the head-mounted display 150, the depth sensor 130, and a (robotic or manual) arm 160 which holds the microscope 120 in place, and which is coupled to the base unit 105 and to the microscope 120. In general, these optional and non-optional components may be coupled to the system 110, which may be configured to control and/or interact with the respective components.

While the proposed concept can be used with microscopes that support a fully optical view of the sample through a primary pair of oculars (e.g., as an alternative), the following examples assume that a digital view on a sample is provided. Various examples of the present disclosure thus relate to a microscope system with a digital microscope, i.e., a microscope that uses imaging sensor data generated the at least one optical imaging sensor 122; 124; 126; 128 to generate a digital view of the sample 10, and to generate one or more display signals to provide the digital view to the digital viewer or viewers (e.g., the digital oculars 140; 145, or the head-mounted display 150). In particular, the system may be configured to obtain stereoscopic imaging sensor data from at least a first and a second optical imaging sensor of the microscope, e.g., from one or two pairs of optical imaging sensors of the microscope. In FIG. 1*a*, two pairs of optical imaging sensors are shown—a first pair (122; 124) of optical imaging sensors for performing reflectance imaging (i.e., visible light imaging) and a second pair (126; 128) for performing fluorescence imaging. The respective pairs of optical imaging sensors may provide their respective imaging sensor data to the system 110, e.g., reflectance imaging sensor data from the first pair and fluorescence imaging sensor data from the second pair of optical imaging sensors. Accordingly, the stereoscopic imaging sensor data may comprise separate reflectance imaging sensor data and fluorescence imaging sensor data. The system 110 may be configured to provide the digital view of the sample, and to generate a display signal or multiple display signals for the display devices 140; 145; 150 of the microscope system to show the digital view of the sample.

In FIG. 1*c*, the surgical microscope system 100 is shown with three display devices—a primary pair of digital (or optical) oculars 140, which are used by the main surgeon, a secondary pair of digital oculars 145, which are to be used by the assistant that is positioned to the side of the microscope, and a head-mounted display 150, which may be virtual-, augmented- or mixed-reality reality goggles, which may also be used by the main surgeon or by the assistant (or another assistant). For example, the head-mounted display may be a display device that is to be worn by a person, e.g., the main surgeon or an assistant, on or around the head, such that one or two displays are arranged in front of the eye or eyes of the person.

The microscope system may enable concurrent operation of one, two, or three of the display devices. For example, the main surgeon might use the head-mounted display, with the assistants not using a display device (or an auxiliary display that is arranged at the base unit of the surgical microscope system). Alternatively, the main surgeon may use the primary pair of digital oculars 140, and the assistant may use the secondary pair of digital oculars 145 or the head-mounted display 150, or one assistant may use the secondary pair of digital oculars 145 and another assistant may use the head-mounted display 150. Depending on the configuration being used, different types of display signals may be generated. For example, the placement of the primary pair of digital oculars may be according to the optical design of the microscope (or vice versa), such that the imaging sensor data collected by the at least one optical imaging sensor of the microscope can be used to (directly) generate the view of the sample for the primary pair of digital oculars. In particular, the system 110 may be configured to generate a primary display signal based on the stereoscopic imaging sensor data, and to provide the primary display signal to the primary pair of oculars 140 of the microscope system. Moreover, the system 110 may be configured to generate a secondary display signal based on the three-dimensional representation of the sample, and to provide the secondary display signal to a secondary display device 145; 150 of the microscope system, i.e., the secondary pair of oculars 145 or the head-mounted display 150. In some configurations, the system may be configured to generate two secondary display signals that are based on the three-dimensional representation of the sample, albeit based on different viewing angles of the secondary pair of oculars 140 and the head-mounted display 150.

As outlined above, the proposed concept may also be used with a fully optical microscope or with a hybrid digital-optical microscope. In particular, it can be implemented in a microscopes that lacks an optical imaging sensor being used to generate an optical view. In this case, a separate sensor, such as a depth sensor 130, may be used to provide the sensor data representing the view of the sample being observed through the microscope 120 of the microscope. For example, the depth sensor 130 may be housed within the microscope 120 and may use the objective of the microscope. Alternatively, the depth sensor 130 may be arranged outside the microscope, e.g., at the bottom of the microscope towards the sample to be viewed through the microscope, such that it is aligned with the view of the sample 10 being observed through the microscope 120 of the microscope system.

Depending on the sensor or sensors being used, different types of techniques may be employed to generate the three-dimensional representation of the sample. In the present concept, the three-dimensional representation of the sample comprises a three-dimensional representation of a surface of the sample facing towards microscope. The side of the sample facing away from the microscope is of no or little importance, as the computer-generated view on the sample also (only) shows the surface of the sample facing towards the microscope. For example, the three-dimensional representation of the sample may be a three-dimensional model of a surface of the sample facing towards the microscope.

In the following, two techniques for determining the three-dimensional representation of the sample are introduced—a first technique that is based on processing stereoscopic imaging sensor data, and a second technique that is based on processing depth sensor data of a depth sensor. However, other techniques may be used as well. Moreover, multiple techniques may be combined, e.g., in order to improve the accuracy and/or color acuity of the resulting computer-generated view on the sample.

First, the technique for determining the three-dimensional representation of the sample based on the stereoscopic imaging sensor data is illustrated. In other words, the system 100 may be configured to determine the three-dimensional representation of the sample based on the stereoscopic imaging sensor data. As shown in FIG. 1*b*, in stereo microscopes, the two stereoscopic channels (that arrive at the optical imaging sensors 122; 126 and 124; 128, respectively) show the sample 10 from slightly different angles. Therefore, the stereoscopic imaging sensor data shows two views on the sample from the two different angles. While flat surfaces appear very similar in both images of the stereoscopic image sensor data, non-flat structures, such as cavities, slopes, or elevations, appear dissimilar between images. A so-called disparity map may be generated to represent the differences between the two images of the stereoscopic imaging sensor data. In other words, the system may be configured to determine a disparity map based on the stereoscopic imaging sensor data. The disparity map represents the differences between the between the two images of the stereoscopic imaging sensor data. The reconstruction of a 3D object from a pair of disparity maps is a known technique. While the reconstruction is slightly different as the microscope has effectively a pair of converging cameras, rather than cameras with parallel optical axes, the principle can be also be applied to stereoscopic images of a stereo microscope. Thus, the three-dimensional representation of the sample may be generated based on the disparity map.

In general, the three-dimensional representation of the sample comprises two aspects—the three-dimensional structure (the actual three-dimensional model, which may be represented by vertices, polygons and/or surfaces), and color information, which is used to color the three-dimensional structure. In the case of using the stereoscopic imaging sensor data, both the three-dimensional structure and the color information may be derived from the stereoscopic imaging sensor data. In other words, the system may be configured to determine the three-dimensional structure of the three-dimensional representation based on the disparity map. The system may be configured to determine the color information of the three-dimensional representation based on color information included in the stereoscopic imaging sensor data. For example, the system may be configured to determine the color information based on a correspondence between pixels of the stereoscopic imaging sensor data, pixels of the disparity map and polygons/surfaces of the three-dimensional representation. For example, the system may be configured to determine, for each polygon/surface of the three-dimensional model, a corresponding pixel of the disparity map, and thus also a corresponding pixel of the stereoscopic imaging sensor data and use the color at the pixel of the stereoscopic imaging sensor data to color the polygon/surface of the three-dimensional representation. For example, the system may be configured to generate textures comprising the color information based on the correspondence between the polygons/surfaces of the three-dimensional representation and the pixels of the stereoscopic imaging sensor data, and to apply the textures on the three-dimensional representation.

The second technique for generating the three-dimensional representation of the sample is based on using depth sensor data of the depth sensor 130 of the microscope system. In other words, the system may be configured to obtain the depth sensor data from the depth sensor 130 of the microscope system. For example, different types of depth sensors may be used, such as a Time of Flight (ToF) sensor, e.g., an infrared light-based ToF sensor or an ultrasound based ToF sensor, or a structured light sensor. For example, a ToF sensor comprises an emitter component and a sensing component, with the emitter component being configured to emit a signal (e.g., infrared or ultrasound) towards the sample, and with the sensing component being configured to sense reflections of the signal reflected by the sample, and to determine the depth sensor data based on a time between emission and sensing of the reflection (or rather the phase difference thereof). A structured light sensor also comprises an emitter component and a sensing component, with the emitter component being configured to project structured light onto the sample and the sensing component being configured to generate imaging sensor data of the sample. The imaging sensor data shows distortions caused by the shape of the sample, i.e., the three-dimensional structure of the sample, which can be used to determine the three-dimensional representation of the sample. Both types of sensor generate depth sensor data, e.g., a point cloud, that represent the three-dimensional structure of the sample. The system may thus be configured to determine the three-dimensional representation of the sample, and in particular the three-dimensional structure of the three-dimensional representation of the sample, from the depth sensor data. In addition, the system may be configured to match the depth sensor data to the view of the microscope, e.g., by cropping the depth sensor data and/or by distorting the depth sensor data to obtain the same field of view as the microscope (and thus the imaging sensor data of the at least one optical imaging sensor of the microscope).

In some configurations, the depth sensor is not only suitable for determining the three-dimensional structure of the sample, but also the color of the sample. For example, the depth sensor may be suitable for providing, in addition to the depth information, color information of the sample. In particular, the depth sensor may be configured to provide so-called RGB-D data, which is a combination of color information (of the Red, Green and Blue, RGB, color channel) and depth information (D). Accordingly, the depth sensor data may comprise depth information and color information. Both components may be used to determine the three-dimensional representation of the sample. For example, the system may be configured to determine the three-dimensional structure of the three-dimensional representation based on the depth information (D) included in the depth sensor data and to determine the color information of the three-dimensional representation based on the color information (RGB) included in the depth sensor data. Alternatively, only the depth information might be taken from the depth sensor data, and the color information may be taken from the (stereoscopic or non-stereoscopic) imaging sensor data of the at least one optical imaging sensor of the microscope. For example, the depth sensor data might (only) comprise depth information (without color information, or with only greyscale color information). In this case, the system is configured to determine the three-dimensional structure of the three-dimensional representation based on the depth information included in the depth sensor data and to determine the color information of the three-dimensional representation based on color information included in the imaging sensor data. For example, the afore-mentioned matching of the depth sensor data and the view of the microscope, and thus the field of view of the optical imaging sensor data, may be used to apply the color information of the imaging sensor data to the three-dimensional structured generated from the depth sensor data. As is evident, the same technique can be applied even if the depth sensor data comprises color information, as the color acuity of the imaging sensor data is likely better than the color acuity of the depth sensor.

In some examples, both techniques may be used together. For example, depth sensors often have a lower resolution than the optical imaging sensors of the microscopes, while the determination of the three-dimensional structure from the disparity map may be less precise at steep angles. Therefore, both techniques may be combined. For example, the system may be configured to determine a first three-dimensional structure based on the disparity map and a second three-dimensional structure based on the depth sensor data. The system may be configured to determine a difference between the first and second three-dimensional structure, and to fuse the two three-dimensional structures together, e.g., by replacing portions of the first three-dimensional structure with corresponding portions of the second three-dimensional structure where the corresponding portions diverge.

Digital microscopes used in surgical microscopes system often have the ability to sense and visualize fluorescence emissions. In surgical microscopy, such fluorescence emissions are generated by injecting fluorophores into the surgical site (e.g., into blood vessels) and illuminating the surgical site with light having a wavelength that corresponds to a fluorescence excitation wavelength of the fluorophore. The fluorophores emit the fluorescence emissions in response to the light having the wavelength that corresponds to the fluorescence excitation wavelength of the fluorophore. Since the respective wavelengths are known, the fluorescence emissions can be sensed specifically by the optical imaging sensor or sensors used for fluorescence imaging. As the "white light" used for performing reflectance imaging is typically much brighter than the fluorescence emissions, a portion of the white light may be filtered out, e.g., using a bandpass filter, such that the fluorescence emission wavelength band is excluded. This way, the fluorescence emissions may be sensed separately from the white light, at low intensities, and then be digitally shown using the viewer(s) of the surgical microscope system, e.g., in isolation, or as a pseudocolor representation in a composite view comprising the white light image and the pseudocolor representation of the fluorescence emissions.

Since fluorescence imaging is a useful feature in surgical microscopes, the proposed concept may also be applied to fluorescence imaging. For example, as outlined above, the (stereoscopic) imaging sensor data may comprise separate reflectance imaging sensor data and fluorescence imaging sensor data. The fluorescence imaging sensor data may be used to include a representation of the fluorescence emissions in the three-dimensional representation of the sample. In other words, the system may be configured to include a representation of the fluorescence imaging sensor data in the three-dimensional representation of the sample.

In general, the representation of the fluorescence imaging sensor data may be introduced at various points of the process. In some examples, the representation of the fluorescence imaging sensor data may be included as part of the color information, with the three-dimensional structure being determined without using the fluorescence imaging sensor data. This approach is suitable for both techniques introduced above and is also suitable for three-dimensional representations where the color information only represents the fluorescence emissions. Alternatively, or additionally, if the three-dimensional representation is generated based on the stereoscopic imaging sensor data, e.g., if both the white light image and the pseudocolor representation of the fluorescence are to be shown as part of the color information, the disparity map can be generated based on composite white light-pseudocolor representation images. In other words, the system may be configured to generate composite stereoscopic images from the reflectance imaging sensor data and the fluorescence imaging sensor data (e.g., by including a pseudocolor representation of the fluorescence imaging sensor data). The system may be configured to generate the disparity map based on the composite stereoscopic images, and to determine the three-dimensional representation of the sample based on the disparity map. For example, the three-dimensional structure may be derived from the disparity map, and the color information may be derived from the correspondence between the polygons/surfaces of the three-dimensional structure and the pixels of the composite stereoscopic images.

In general, the determination of the three-dimensional representation is computationally expensive, in particular since the three-dimensional representation may be updated periodically, e.g., at the frame rate of the (secondary) display device or at the sample rate of the depth sensor. For example, the sensor data comprises a plurality of temporally successive samples of sensor data, e.g., samples of imaging sensor data or samples of depth sensor data. For updating the three-dimensional representation, two approaches may be chosen. For example, a stateless approach may be used, where the three-dimensional representation is recreated "from scratch" in every iteration. In other words, the system may be configured to recreate the three-dimensional representation of the sample for each sample of the plurality of temporally successive samples of sensor data. Alternatively, a stateful approach may be used, where the three-dimensional representation is iteratively refined over time, filtering out sudden variations due to ambiguities in the sensor data. In other words, the system may be configured to iteratively update the three-dimensional representation of the sample based on the plurality of temporally successive samples of sensor data. For example, the system may be configured to generate a new three-dimensional representation of the sample for each sample of the sensor data, and to refine the existing three-dimensional representation of the sample based on the newly generated three-dimensional representation of the sample, e.g., by limiting a maximal allowed change of the three-dimensional representation per iteration/sample.

The three-dimensional representation of the sample is the basis for the generation of the computer-generated view of the sample. In effect, the three-dimensional representation is used as a 3D model of the sample. As is known from 3D Computer Aided Design (CAD) and video games, a computer-generated view of an object can be generated from such a three-dimensional model, e.g., for display on a monitor or television. A similar approach is taken in the present disclosure, where the three-dimensional representation is used to generate the computer-generated view on the sample. In 3D modeling or gaming, a virtual "camera" or gamer viewpoint is placed relative to the 3D model and used to define the point of view of the observer. In the present context, this viewing angle is determined based on the viewing angle of the observer, which can be derived from position of the display device (e.g., 90 degrees to the side in case a side-assistant viewer is used, or at an arbitrary angle if a head-mounted display is used). The system 110 thus determines the information on a viewing angle of an observer, so that it can be used to determine the computer-generated view of the sample.

The viewing angle of the observer can be determined in various ways, depending on what kind of display device is used. For example, if the system is configured to provide the display signal to the secondary pair of oculars 145 of the microscope system, the information on the viewing angle of the observer may be determined based on a (fixed) orientation of the secondary pair of oculars relative to the microscope, e.g., offset by 90 degrees, by 180 degrees or by 270 degrees, depending on where the secondary pair of oculars is arranged relative to the primary pair of oculars of the microscope. In other words, the viewing angle may be offset by 90 degrees, by 180 degrees or by 270 degrees to a digital view provided to the primary pair of ocular displays. For example, this offset can be hard-coded, e.g., based on the position of the secondary pair of ocular displays, or defined by user input, e.g., via a button or touchscreen of the microscope system. In other words, the system may be configured to determine the information on the viewing angle of the observer from user input obtained via an input device or from (pre-defined) information on a position of the secondary pair of oculars 145 of the microscope system. If the system is configured to provide the display signal to the head-mounted display 150, the information on the viewing angle of the observer may be determined based on an orientation of the head-mounted display relative to the sample. In this case, arbitrary viewing angles are possible. In this case, the viewing angle may be offset in multiple dimensions, depending on pitch and yaw (and possibly roll) of the head-mounted display. For example, the viewing angle may be determined based on a straight (virtual) line between the head-mounted display and the sample (or microscope). In this case, the system may be configured to determine the information on the viewing angle of the observer from sensor data of a position sensor or acceleration sensor of the head-mounted display 150, and/or from positioning information of a camera-based positioning system. For example, the head-mounted display 150 may be configured to provide position sensor data and/or acerbation sensor data to the system, which the system may use to determine the orientation of the head-mounted display relative the sample. Alternatively, the system may be configured to obtain the positioning information from the camera-based positioning system (which may be part of the microscope system), and to determine the orientation of the head-mounted display relative the sample based on the positioning information from the camera-based positioning system.

Once the viewing angle is known, it is used to determine (i.e., generate) the computer-generated view of the sample from the viewing angle of the observer. As outlined above, the viewing angle of the observer is used to generate the position of the virtual camera relative to the three-dimensional representation (i.e., model). Using the virtual camera, the view of the sample, as seen from the viewing angle of the observer, is generated, using the techniques known from 3D CAD or 3D game design. For example, the three-dimensional representation may define a scene to be shown, with the viewing angle of the sample defining a position of a virtual camera relative to which the scene is to be rendered. During the generation of the computer-generated view of the sample, the scene may be transformed so that the camera is at the origin, and a camera transformation is performed. In addition, projection, lighting, clipping, window-viewport transformation, and rasterization may be performed to obtain the computer-generated view of the sample. In some examples, the computer-generated view of the sample is a computer-generated stereoscopic view of the sample. Accordingly, the display signal may be a display signal for driving a stereoscopic display device, i.e., a display signal comprising imaging data for two channels. In this case, two virtual cameras may be defined, based on a spatial relationship between the oculars or displays of the head-mounted display.

The system then uses the computer-generated view of the sample to generate the display signal(s) and provides the display signal(s) to the respective display device(s). For example, the display signal may be a signal for driving (e.g., controlling) the respective display device 140; 145; 150. For example, the display signal may comprise video data and/or control instructions for driving the display. For example, the display signal may be provided via one of the one or more interfaces 112 of the system. Accordingly, the system 110 may comprise a video interface 112 that is suitable for providing the video signal to the display of the touch screen. The system may be configured to provide the display signal to the respective display(s), e.g., via the video interface 112.

Figure 3:
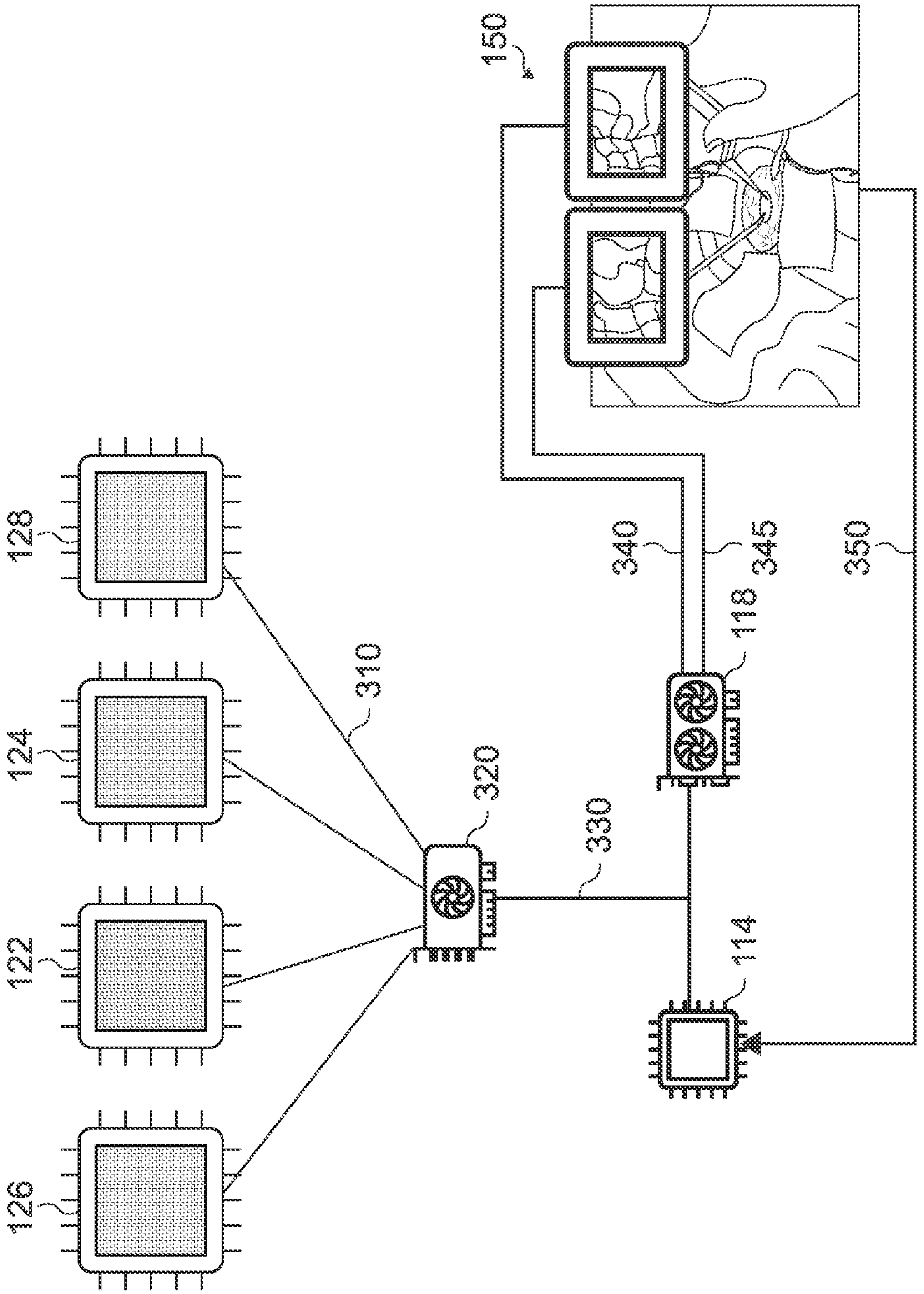
FIG. 3 shows a schematic diagram of a microscope system according to the proposed concept.

In various examples of the proposed surgical microscope system, at least one optical imaging sensor is used to provide the imaging sensor data. Accordingly, the optical imaging sensor may be configured to generate the respective imaging sensor data, e.g., the stereoscopic imaging sensor data, the fluorescence imaging sensor data and/or the reflectance imaging sensor data. For example, the optical imaging sensors 122; 124; 126; 128 of the microscope 120 may comprise or be APS (Active Pixel Sensor)—or a CCD (Charge-Coupled-Device)-based imaging sensors. For example, in APS-based imaging sensors, light is recorded at each pixel using a photodetector and an active amplifier of the pixel. APS-based imaging sensors are often based on CMOS (Complementary Metal-Oxide-Semiconductor) or S-CMOS (Scientific CMOS) technology. In CCD-based imaging sensors, incoming photons are converted into electron charges at a semiconductor-oxide interface, which are subsequently moved between capacitive bins in the imaging sensors by a circuitry of the imaging sensors to perform the imaging. The processing system 110 may be configured to obtain (i.e., receive or read out) the imaging sensor data from the respective optical imaging sensor. The imaging sensor data may be obtained by receiving the imaging sensor data from the respective optical imaging sensor (e.g., via the interface 112), by reading the imaging sensor data out from a memory of the respective optical imaging sensor (e.g., via the interface 112), or by reading the imaging sensor data from a storage device 116 of the system 110, e.g., after the imaging sensor data has been written to the storage device 116 by the respective optical imaging sensor or by another system or processor. For example, as shown in FIG. 3, the imaging sensor data may be obtained via an acquisition/capture card 320.

The one or more interfaces 112 of the system 110 may correspond to one or more inputs and/or outputs for receiving and/or transmitting information, which may be in digital (bit) values according to a specified code, within a module, between modules or between modules of different entities. For example, the one or more interfaces 112 may comprise interface circuitry configured to receive and/or transmit information. The one or more processors 114 of the system 110 may be implemented using one or more processing units, one or more processing devices, any means for processing, such as a processor, a computer or a programmable hardware component being operable with accordingly adapted software. In other words, the described function of the one or more processors 114 may as well be implemented in software, which is then executed on one or more programmable hardware components. Such hardware components may comprise a general-purpose processor, a Digital Signal Processor (DSP), a micro-controller, etc. The one or more storage devices 116 of the system 110 may comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage. The one or more graphics processing units 118 may comprise a plurality of processing cores configured to perform operations related to the processing of image graphics and/or to perform general-purpose computations.

More details and aspects of the system, method, computer program and (surgical) microscope system are mentioned in connection with the proposed concept, or one or more examples described above or below (e.g., FIGS. 2 to 6). The system, method, computer program and (surgical) microscope system may comprise one or more additional optional features corresponding to one or more aspects of the proposed concept, or one or more examples described above or below.

Figure 2:
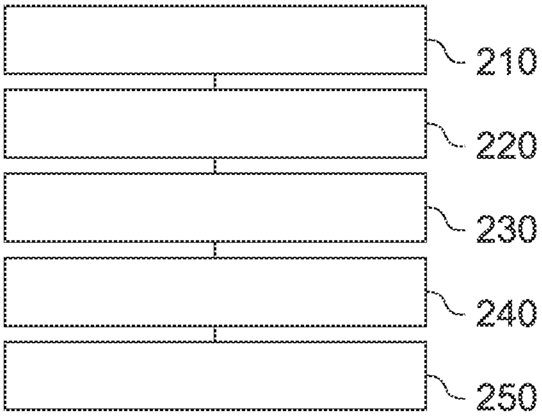
FIG. 2 shows a flow chart of an example of a method for a microscope system.

FIG. 2 shows a flow chart of an example of a corresponding method for a microscope system, e.g., for the microscope system 100 shown in FIGS. 1*a* to 1*c*. Features introduced in connection with the system or microscope system of FIGS. 1*a* to 1*c* may likewise be included in the corresponding method. For example, the method may be performed by the components of the microscope system 100 shown in FIGS. 1*a* to 1*c*, and in particular by the system 110 shown in FIGS. 1*a* to 1*c*. The method comprises obtaining 210 sensor data of at least one sensor of the microscope system. The sensor data represents a view of a sample being observed through a microscope of the microscope system. The method comprises determining 220 a three-dimensional representation of the sample based on the sensor data. The method comprises determining 230 information on a viewing angle of an observer. The method comprises determining 240 a view of the sample from the viewing angle of the observer based on the three-dimensional representation of the sample. The method comprises generating 250 a display signal for a display device, the display signal comprising the view of the sample.

More details and aspects of the method are mentioned in connection with the proposed concept, or one or more examples described above or below (e.g., FIGS. 1*a* to 1*c*, 3 to 6). The method may comprise one or more additional optional features corresponding to one or more aspects of the proposed concept, or one or more examples described above or below.

Various examples of the present disclosure relate to a 3D digital viewer that supports arbitrary view orientation.

Many surgical microscopes have a pair of stereoscopic cameras that provide a 3D view of the operation site. The microscope will normally be oriented so that the 3D view is correct for the operating surgeon, so that the left and right cameras provide an intuitively correct view. For assistants who will be standing usually at an angle, for example 90 degrees to the surgeon, if the camera views are presented to their left and right eyes, the view of the operation site will be wrongly aligned with their orientation relative to the operation site. In effect, their perceived perceptive may be wrong. This may be even more confusing if the assistant surgeon has a head mounted display rather than a fixed assistant ocular and is not constrained to one orientation. The view presented via the side-assistant viewer or head-mounted viewer may thus be limited by the positioning and location of the two optical channels on the microscope. In particular, the view might not change when the user moves their head or with the user's position and may be potentially unintuitive or confusing.

The proposed concept may be used to overcome these drawbacks. In the proposed concept, the stereoscopic images from the microscope camera may be used to generate a 3D object (i.e., a three-dimensional representation of the sample). A pair of new stereoscopic images may be generated from the 3D object using the orientation (position and angle) of the viewer (i.e., observer), and may be transmitted to the viewer. The proposed concept may thus be used to generate a 3D view of the operation site that is correct for the viewer. The head-mounted viewer user may be provided with a fully 3D view that corresponds to their head position or angle.

FIG. 3 shows a schematic diagram of a microscope system according to the proposed concept. As shown in FIG. 3, imaging sensor data from left 126 and right 128 near-infrared (NIR) sensors (used for fluorescence imaging) and from left 122 and right 124 visible light (VL) sensors (used for reflectance imaging) may be provided to an acquisition card (i.e., capture card) 320, which is connected to the sensors via a Universal Serial Bus (USB) or Serial Digital Interface (SDI) 310. The acquisition card may be connected to a Central Processing Unit (CPU) 114 and to a Graphics Processing Unit (GPU) 118 via the Peripheral Component Interface express (PCIe) interface 330. The GPU 118 may provide two SDI signals, SDI left 340 and SDI left 345, to a side assistant viewer or, as shown in FIG. 3, a head-mounted viewer 150, which is used to provide a stereoscopic view on a surgical site. Information on an orientation of the viewer is fed back 350 to the CPU 114.

Figure 4:
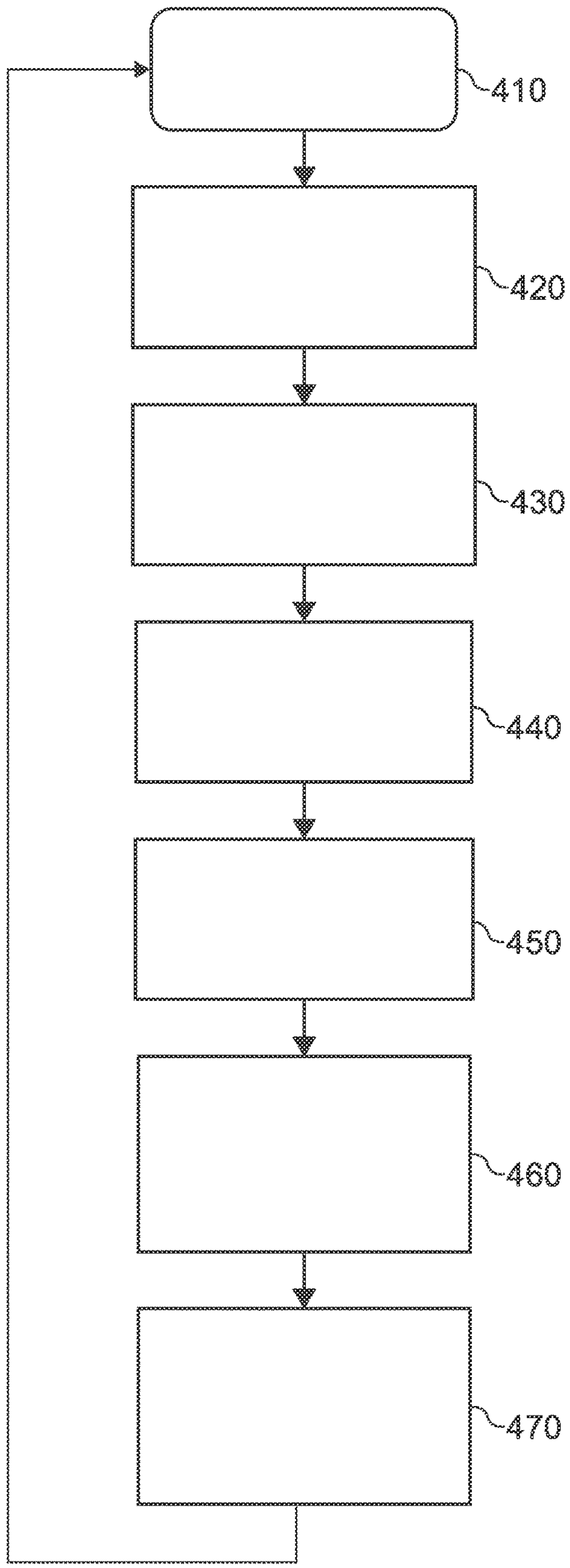
FIG. 4 shows a flow chart of an example of a method for a microscope system that uses reflectance imaging.

FIG. 4 shows a flow chart of an example of a method for a microscope system that uses reflectance imaging. The method starts at starting point 410 and continues with receiving 420 left and right images from microscope cameras. Subsequently, a disparity map is calculated 430 (based on the left and right images), and a 3D view is constructed 440 from the disparity map. An orientation of a desired viewpoint is received 450, and left and right images for the desired viewpoint are generated 460. Finally, the images are transmitted 470 to the viewer, and the method returns to the starting point 410.

Figure 5:
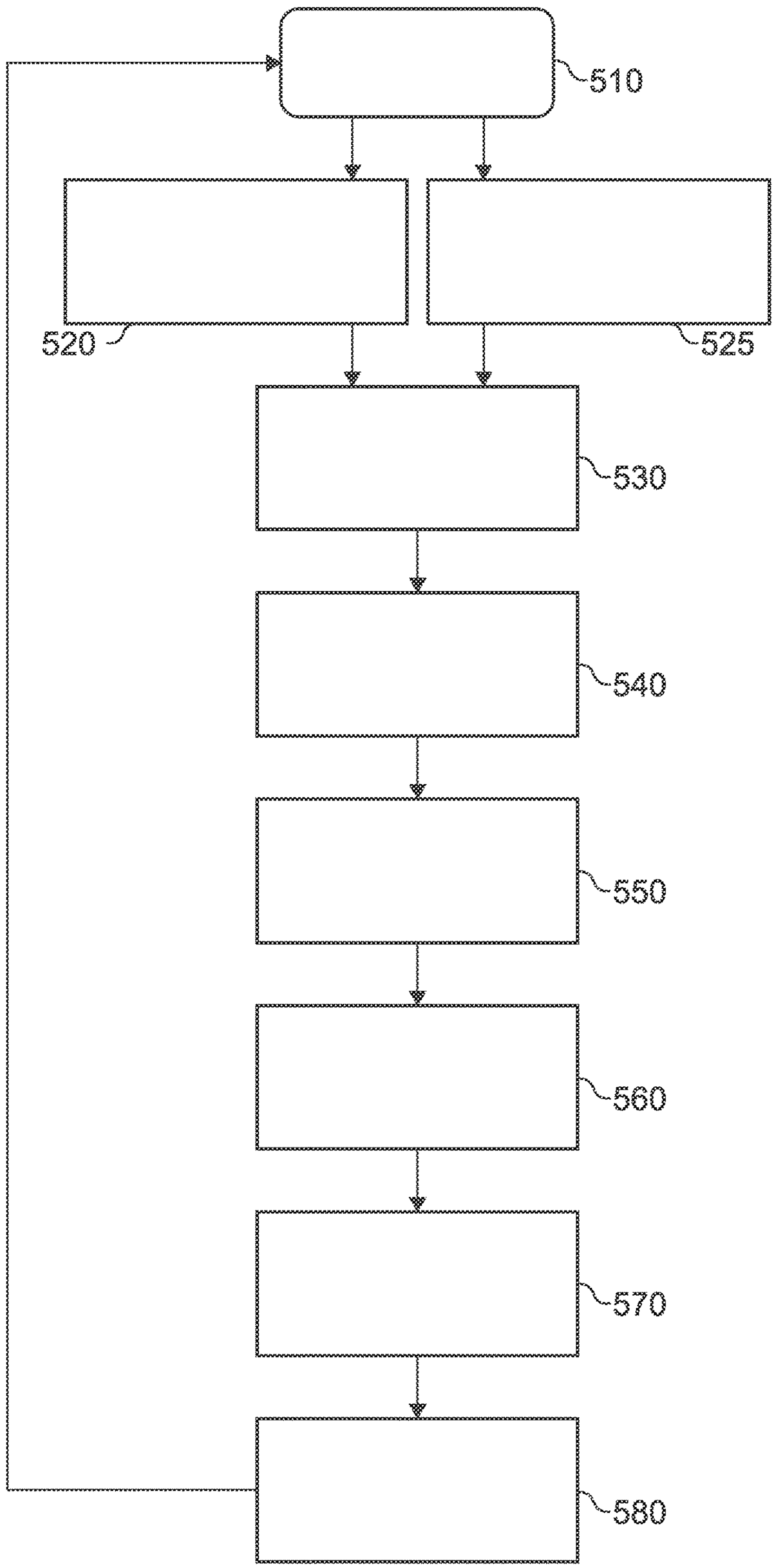
FIG. 5 shows a flow chart of an example of a method for a microscope system that uses reflectance imaging and fluorescence imaging.

FIG. 5 shows a flow chart of an example of a method for a microscope system that uses reflectance imaging and fluorescence imaging. The method starts at starting point 510 and continues with receiving 520 left and right images from visible light cameras and receiving 525 left and right image from fluorescence cameras. Subsequently, composite visible light and pseudocolor images are generated 530, a disparity map is calculated 540 (based on the composite images), and a 3D view is constructed 550 from the disparity map. An orientation of a desired viewpoint is received 560, and left and right images for the desired viewpoint are generated 570. Finally, the images are transmitted 580 to the viewer, and the method returns to the starting point 510.

In effect, the proposed concept may be used for generating a pair of stereoscopic images of an operation site viewed through a digital microscope and providing the images to a viewer not used by the main surgeon, for example a head mounted viewer, or a side assistant viewer mounted on the optics carrier.

Reconstruction of a 3D object from a pair of disparity maps is a known technique. This may be combined with a technique known from 3D modelling or 3D video games, where a realistic view (of a 3D world) is generated from the 3D model in real-time. The reconstruction in this case is slightly different to the usual circumstances as the microscope has effectively a pair of converging cameras, rather than cameras with parallel optical axes, but the principle is the same. An alternative approach which requires additional hardware uses a Time of Flight (ToF) or other depth sensor, which may be used to provide a 3D model of the surface, potentially with lower errors than reconstruction from disparity maps, but possibly with worse resolution. In some examples, both techniques may be combined to provide an accurate model.

The orientation of the viewer can be fixed, for example for an assistant ocular mounted on the optics carrier, or can be variable, in the case of a head-mounted viewer. The orientation of the head-mounted viewer can be detected by any suitable method, for example as known from VR headsets or surgical navigation systems. The generated view may be VL (visible light), FL (fluorescence light) or a combined image.

The proposed concept combines the generation of a three-dimensional model with the generation of a stereoscopic view from the three-dimensional model to provide a digital view of a surgical site with arbitrary orientation, corresponding to the known or detected orientation of the viewer.

The proposed concept may relate to the generation of a display signal, and to a user experience. It may be applicable to various or all types of microsurgery and may be implemented in software.

More details and aspects of the 3D viewer with arbitrary orientation are mentioned in connection with the proposed concept or one or more examples described above or below (e.g., FIG. 1*a* to 2). The 3D viewer with arbitrary orientation may comprise one or more additional optional features corresponding to one or more aspects of the proposed concept, or one or more examples described above or below.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some embodiments relate to a microscope comprising a system as described in connection with one or more of the FIGS. 1 to 5. Alternatively, a microscope may be part of or connected to a system as described in connection with one or more of the FIGS. 1 to 5.

Figure 6:
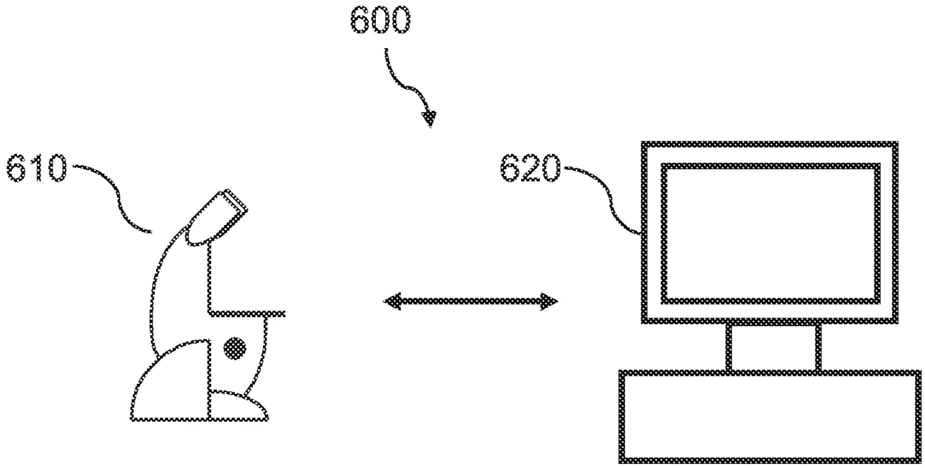
FIG. 6 shows a schematic diagram of a system comprising a microscope and a computer system.

FIG. 6 shows a schematic illustration of a system 600 configured to perform a method described herein. The system 600 comprises a microscope 610 and a computer system 620. The microscope 610 is configured to take images and is connected to the computer system 620. The computer system 620 is configured to execute at least a part of a method described herein. The computer system 620 may be configured to execute a machine learning algorithm. The computer system 620 and microscope 610 may be separate entities but can also be integrated together in one common housing. The computer system 620 may be part of a central processing system of the microscope 610 and/or the computer system 620 may be part of a subcomponent of the microscope 610, such as a sensor, an actor, a camera or an illumination unit, etc. of the microscope 610.

The computer system 620 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 620 may comprise any circuit or combination of circuits. In one embodiment, the computer system 620 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 620 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 620 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 620 may also include a display device, one or more speakers, and a keyboard and/or controller, which can include a mouse, trackball, touch screen, voice-recognition device, or any other device that permits a system user to input information into and receive information from the computer system 620.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

LIST OF REFERENCE SIGNS

The reference signs are:

10 Sample
100 Microscope system
110 System
112 Interface
114 Processor
116 Storage device
118 Graphics processing unit
120 Microscope
122; 124; 126; 128 Optical imaging sensors
130 Depth sensor
140 Primary pair of oculars
145 Secondary pair of oculars
150 Head-mounted display
160 Arm
210 Obtaining sensor data
220 Determining a three-dimensional representation of a sample
230 Determining information on a viewing angle
240 Determining a computer-generated view of the sample
250 Generating a display signal
310 USB/SDI Interface
320 Acquisition card
330 PCIe interface
340; 345 SDI signals
350 Feedback information
410 Starting point
420 Receiving left and right images from microscope cameras
430 Calculating a disparity map
440 Constructing a 3D view from the disparity map
450 Receiving an orientation of a desired viewpoint
460 Generating left and right images for the desired viewpoint
470 Transmitting the images to the viewer
510 Starting point
520 Receiving left and right images from visible light cameras
525 Receiving left and right images from fluorescence cameras
530 Generating composite visible light and pseudocolor images
540 Calculating a disparity map
550 Constructing a 3D view from the disparity map
560 Receiving an orientation of a desired viewpoint
570 Generating left and right images for the desired viewpoint
580 Transmitting the images to the viewer
600 System
610 Microscope
620 Computer system

What is claimed is:

1. A system for a microscope system, the system comprising one or more processors and one or more storage devices, wherein the system is configured to:

obtain stereoscopic imaging sensor data from at least a first optical imaging sensor and a second optical imaging sensor of the microscope system, the stereoscopic imaging sensor data representing a view of a sample being observed by a primary observer through a primary pair of oculars of the microscope system;

determine a three-dimensional surface model of the sample based on the stereoscopic imaging sensor data;

determine information on a viewing angle of a secondary observer;

determine a computer-generated view of the sample from the viewing angle of the secondary observer based on the three-dimensional surface model of the sample; and generate a display signal for a display device, the display signal comprising the computer-generated view of the sample.

2. The system according to claim 1, wherein the system is configured to determine a disparity map based on the stereoscopic imaging sensor data, and to determine the three-dimensional surface model of the sample based on the disparity map.

3. The system according to claim 2, wherein the system is configured to determine a three-dimensional structure of the three-dimensional surface model based on the disparity map, and to determine color information of the three-dimensional surface model based on color information included in the stereoscopic imaging sensor data.

4. The system according to claim 1, wherein the stereoscopic imaging sensor data comprises separate reflectance imaging sensor data and fluorescence imaging sensor data, wherein the system is configured to include a representation of the fluorescence imaging sensor data in the three-dimensional surface model of the sample.

5. The system according to claim 4, wherein the system is configured to generate composite stereoscopic images from the reflectance imaging sensor data and the fluorescence imaging sensor data, to generate a disparity map based on the composite stereoscopic images, and to determine the three-dimensional surface model of the sample based on the disparity map.

6. The system according to claim 1, wherein the system is configured to obtain depth sensor data from a depth sensor of the microscope system, and to determine the three-dimensional surface model of the sample based on the depth sensor data.

7. The system according to claim 6, wherein the depth sensor data comprises depth information and color information, wherein the system is configured to determine a three-dimensional structure of the three-dimensional surface model based on the depth information included in the depth sensor data and to determine color information of the three-dimensional surface model based on the color information included in the depth sensor data.

8. The system according to claim 6, wherein the depth sensor data comprises depth information, wherein the system is configured to obtain imaging sensor data from an optical imaging sensor of the microscope, wherein the system is configured to determine a three-dimensional structure of the three-dimensional surface model based on the depth information included in the depth sensor data and to determine color information of the three-dimensional surface model based on color information included in the imaging sensor data.

9. The system according to claim 1, wherein the system is configured to determine the information on the viewing angle of the secondary observer from one of a user input obtained via an input device, sensor data of a position sensor or acceleration sensor of a head-mounted display, positioning information of camera-based positioning system, and information on a position of a secondary pair of oculars of the microscope system.

10. The system according to claim 1, wherein the system is configured to provide the display signal to a secondary pair of oculars of the microscope system, and to determine the information on the viewing angle of the secondary observer based on an orientation of the secondary pair of oculars relative to the microscope.

11. The system according to claim 1, wherein the system is configured to provide the display signal to a head-mounted display, and to determine the information on the viewing angle of the secondary observer based on an orientation of the head-mounted display relative to the sample.

12. A method for a microscope system, the method comprising:

obtaining stereoscopic imaging sensor data from at least a first optical imaging sensor and a second optical imaging sensor of the microscope system, the stereoscopic imaging sensor data representing a view of a sample being observed by a primary observer through a primary pair of oculars of the microscope system;

determining a three-dimensional surface model of the sample based on the stereoscopic imaging sensor data;

determining information on a viewing angle of a secondary observer;

determining a computer-generated view of the sample from the viewing angle of the secondary observer based on the three-dimensional surface model of the sample; and generating a display signal for a display device, the display signal comprising the view of the sample.

13. A non-transitory, computer-readable medium comprising a program code that, when the program code is executed on a processor, a computer, or a programmable hardware component, causes the processor, computer, or programmable hardware component to perform the method of claim 12.

* * * * *